May 9, 1967 J. R. VUST 3,318,356
TRACTION DEVICE
Filed Oct. 1, 1965
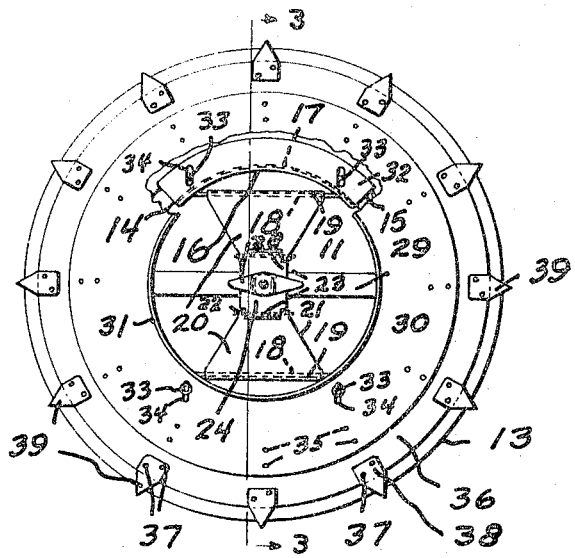
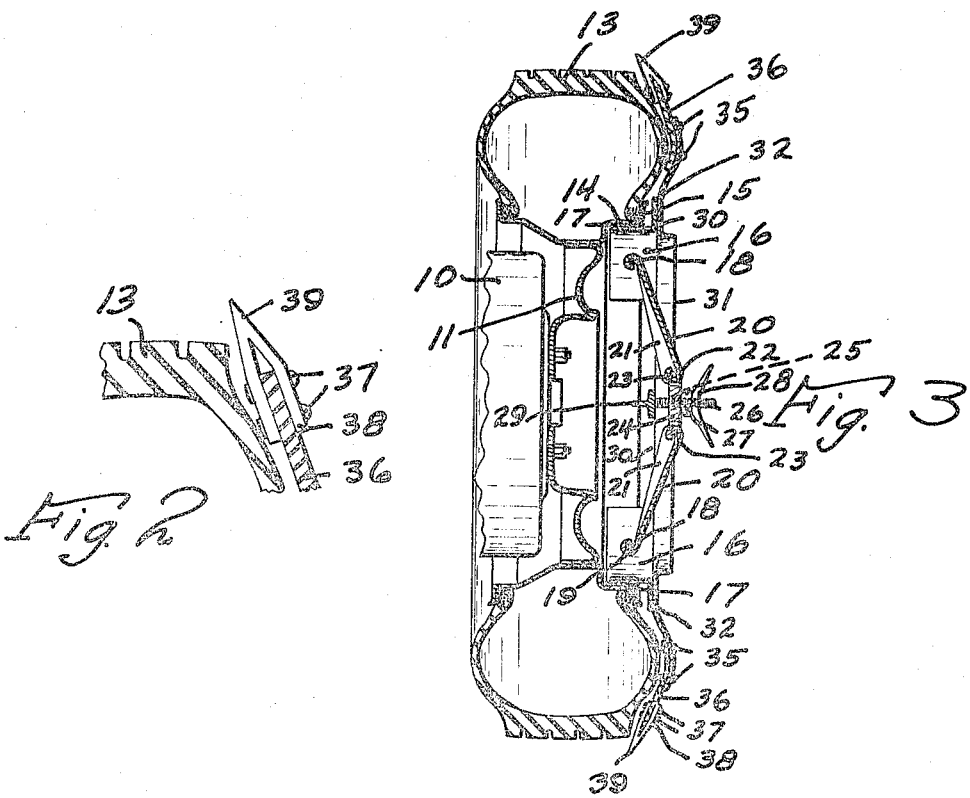
INVENTOR.
John R. Vust
BY
ATTORNEY 3,318,356
TRACTION DEVICE
John R. Vust, 415 W. 2nd St., Sioux City, Iowa 51103
Filed Oct. 1, 1965, Ser. No. 492,073
3 Claims. (Cl. 152—216)

My invention relates to a traction device.

An object of my invention is to provide a traction device which can be quickly and easily attached to a vehicle rim without removing or raising the said rim.

A further object of my invention is to provide a traction device which is positive in operation and yet which includes resilient characteristics.

A further object of my invention is to provide an easily removable traction device.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

FIGURE 1 is a side elevation of the traction device as attached to a rim and tire.

FIGURE 2 is an enlarged detail, and

FIGURE 3 is an enlarged sectional view taken substantially along the lines 3—3 of FIGURE 1.

My invention contemplates the provision of a traction device which can be readily attached to a tire and rim of an automobile when it is desired to operate the vehicle during snow, ice or muddy conditions.

In describing my invention, I have used the character 10 to indicate the brake drum of an automobile wheel, the character 11 further indicating wheel portions, the character 13 indicating the tire itself, and the character 14 indicating the annular rim portion having the flange 15.

The device of my invention comprises a pair of arcuate shoes 16, to which shoes are attached the brake surface members 17 having sufficient frictional or gripping characteristics, and attached across the arcuate shoes 16 are the rods 18, and receiving the rods 18 are the curled end portions 19 of the flat members 20 having the flanges 21, the members 20 having the further curled portions 22, which are adapted to receive the rods 23 which are attached to the centrally positioned plate 24.

The plate 24 includes an opening at 25 which receives the threaded stud 26, which is threadably engaged with the collar 27, which is attached to the rotatable member 28. The character 29 indicates a transverse bar which is attached at either end to the disc-like member 30 having the annular flange 31. The stud 26 is attached to the bar 29.

The shoes 16 include the flanges 32 which are secured to suitable screws 33, which are slidably received within the slots 34, which slots are formed in the member 30.

Securely riveted as at 35 to the member 30, is a ring shaped or annular rubber member 36, which member can be made from a tire carcass or otherwise, and which has resilient characters.

Securely riveted as at 37 to the member 36 are the radially positioned gripping lugs 38, terminating in the pointed ends 39, the ends 39 being adapted to project beyond the outer periphery of the tire 13.

The traction device is installed and removed in the following manner.

For attaching the device, the shoes 16 carrying the balance of the structure are inserted within the rim portion 14, whereupon the arrangement will appear as in FIGURES 1 and 3, with the resilient rubber member 36 being closely adjacent to the wall of the tire 11, and next the turning member 28 is rotated which will cause the member 27 to bear against the plate 24 and will expand the members 20 outwardly until the brake surfaces at 17 will firmly grip the rim portion 14 whereby the shoes will be firmly secured within these rim portions.

This is the only action required, except for first removing the hub cap of the wheel, and it will be noted that the device is thus installed and with the lug portions 39 projecting radially beyond the outer perimeter of the tire 11. These units can be placed on the rear tires or wherever desired, and it will be noted, that during use the pointed lug members will firmly grip icy surfaces etc., thereby providing a considerable tractive effect to prevent slipping of the tires, and at the same time the resilient member 36 will provide effective resiliency for satisfactory operation.

The device or devices are removed by merely rotating the member 28 in the opposite direction bringing the shoes away from the rim surface etc.

It will now be noted that I have provided the advantages mentioned in the objects of my invention with further advantages being apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A traction device comprising a pair of opposed shoe members, means for radially expanding said shoe members so that said shoe members will tightly engage the inner annular portion of a wheel rim, traction means attached to said shoe members and being adapted to project beyond the peripheral boundaries of a tire mounted on said wheel, said expanding means including a centrally positioned plate, rigid means pivotally attached to said plate and said shoes, means for forcing said plate inwardly toward said wheel to thereby force said shoe members radially outwardly.

2. A traction device comprising a pair of opposed shoe members, means for radially expanding said shoe members so that said shoe members will tightly engage the inner annular portion of a wheel rim, traction means attached to said shoe members and being adapted to project beyond the peripheral boundaries of a tire mounted on said wheel, said expanding means including a centrally positioned plate, rigid means pivotally attached to said plate and said shoes, means for forcing said plate inwardly toward said wheel to thereby force said shoe members radially outwardly, said forcing means including a framework, a threaded stud attached to said framework, a rotatable handle member threadably engaging said stud and bearing against said plate.

3. A traction device comprising a pair of opposed shoe members, means for radially expanding said shoe members so that said shoe members will tightly engage the inner annular portion of a wheel rim, traction means attached to said shoe members and being adapted to project beyond the peripheral boundaries of a tire mounted on said wheel, said expanding means including a centrally positioned plate, rigid means pivotally attached to said plate and said shoes, means for forcing said plate inwardly toward said wheel to thereby force said shoe members radially outwardly, said forcing means including a framework, a threaded stud attached to said framework, a rotatable handle member threadably engaging said stud and bearing against said plate, said traction means including a resilient annular member attached to said framework, traction lugs attached to said resilient annular member.

References Cited by the Examiner

UNITED STATES PATENTS

| | | | |
|---|---|---|---|
| 2,930,656 | 3/1960 | Murray | 301—47 |
| 3,016,078 | 1/1962 | Schmidt | 152—216 |
| 3,133,581 | 5/1964 | Jenks | 152—216 |

BENJAMIN HERSH, *Primary Examiner.*

A. J. JOHNSON, *Assistant Examiner.*